US012560904B2

(12) United States Patent
Lee et al.

(10) Patent No.: US 12,560,904 B2
(45) Date of Patent: Feb. 24, 2026

(54) MACHINE LEARNING (ML)-BASED PROCESS PROXIMITY CORRECTION (PPC) METHOD AND SEMICONDUCTOR DEVICE MANUFACTURING METHOD INCLUDING THE SAME

(71) Applicant: SAMSUNG ELECTRONICS CO., LTD., Suwon-si (KR)

(72) Inventors: Sooyong Lee, Suwon-si (KR); Jeeyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 597 days.

(21) Appl. No.: 17/990,900

(22) Filed: Nov. 21, 2022

(65) Prior Publication Data

US 2023/0324881 A1 Oct. 12, 2023

(30) Foreign Application Priority Data

Apr. 6, 2022 (KR) ........................ 10-2022-0043065

(51) Int. Cl.
G05B 19/4099 (2006.01)

(52) U.S. Cl.
CPC .................... G05B 19/4099 (2013.01); G05B 2219/45031 (2013.01)

(58) Field of Classification Search
CPC .......... G03F 1/36; G03F 1/76; G03F 30/3323; G03F 30/392; G06T 3/4046; G06T 7/0006
USPC ........................................................ 700/121
See application file for complete search history.

(56) References Cited

U.S. PATENT DOCUMENTS

| | | | |
|---|---|---|---|
| 10,008,422 B2 | 6/2018 | Habets et al. | |
| 10,197,908 B2 | 2/2019 | Sriraman et al. | |
| 10,908,498 B2 | 2/2021 | Kim et al. | |
| 2021/0334444 A1* | 10/2021 | Lee | G03F 7/70441 |
| 2022/0035237 A1* | 2/2022 | Lee | G06F 30/392 |
| 2022/0121107 A1* | 4/2022 | Misaka | G06N 3/045 |
| 2023/0325577 A1* | 10/2023 | Moon | G06F 30/398 |
| | | | 716/100 |

FOREIGN PATENT DOCUMENTS

| | | | |
|---|---|---|---|
| JP | 5853532 B2 | 2/2016 | |
| KR | 10-2010-0034611 A | 4/2010 | |

(Continued)

OTHER PUBLICATIONS

Communication dated Jan. 5, 2025, issued by the Korean Ministry of Intellectual Property in Korean Application No. 10-2022-0043065.

*Primary Examiner* — Ronald D Hartman, Jr.
(74) *Attorney, Agent, or Firm* — Sughrue Mion, PLLC

(57) ABSTRACT

A machine learning (ML)-based process proximity correction (PPC) method includes receiving a first layout of an after clean inspection (ACI) including patterns for manufacturing a semiconductor device, extracting features of a first pattern from the first layout, generating a prediction model through ML based on the features of the first pattern, generating an ACI target having a maximum process margin by comparing an upper limit value and a lower limit value of the ACI for at least one condition, generating a second layout of an after development inspection (ADI) by correcting the first layout to correspond to the ACI target, and predicting the ACI through the prediction model, based on the second layout of the ADI.

20 Claims, 15 Drawing Sheets

(56)  References Cited

FOREIGN PATENT DOCUMENTS

| | | | | |
|---|---|---|---|---|
| KR | 10-2020-0028169 | A | 3/2020 | |
| KR | 10-2021-0133364 | A | 11/2021 | |
| TW | I754308 | B * | 2/2022 | ............. G06V 10/46 |
| WO | WO-2021037484 | A1 * | 3/2021 | ............... G06N 5/01 |

* cited by examiner

710

712

MACHINE LEARNING (ML)-BASED PROCESS PROXIMITY CORRECTION (PPC) METHOD AND SEMICONDUCTOR DEVICE MANUFACTURING METHOD INCLUDING THE SAME

CROSS-REFERENCE TO RELATED APPLICATION

This application is based on and claims priority to Korean Patent Application No. 10-2022-0043065, filed on Apr. 6, 2022, in the Korean Intellectual Property Office, the disclosure of which is incorporated by reference herein in its entirety.

BACKGROUND

1. Field

Example embodiments of the disclosure relates to a method of manufacturing a semiconductor device, and more particularly, to a process proximity correction (PPC) method and a semiconductor device manufacturing method including the PPC method.

2. Description of Related Art

In a semiconductor process, a photolithography process using a mask may be performed to form a pattern on a semiconductor substrate such as a wafer. The mask may be a pattern transfer body in which a pattern shape of an opaque material is formed on a transparent base material. In order to manufacture such a mask, a layout of a required pattern is first designed, and then optical proximity correction (OPC) layout data obtained through OPC is transmitted as mask tape-out (MTO) design data. Thereafter, mask data preparation (MDP) may be performed based on the MTO design data, and an exposure process may be performed on the substrate for a mask.

SUMMARY

Provided are a machine learning (ML)-based process proximity correction (PPC) method capable of maximizing a process margin, and a semiconductor device manufacturing method including the ML-based PPC method.

Additional aspects will be set forth in part in the description which follows and, in part, will be apparent from the description, or may be learned by practice of the presented embodiments.

According to an aspect of an example embodiment, an ML-based PPC method may include receiving a first layout of an after clean inspection (ACI) including patterns for manufacturing a semiconductor device, extracting features of a first pattern from the first layout, generating a prediction model through ML based on the features of the first pattern, generating an ACI target having a maximum process margin by comparing an upper limit value and a lower limit value of the ACI for at least one condition, generating a second layout of an after development inspection (ADI) by correcting the first layout to correspond to the ACI target, and predicting the ACI through the prediction model, based on the second layout of the ADI.

According to an aspect of an example embodiment, a method of manufacturing a semiconductor device may include receiving a first layout of an ACI including patterns for manufacturing the semiconductor device, generating a second layout of an ADI by performing an ML-based PPC method on the first layout, and generating a third layout by performing an optical proximity correction (OPC) on the second layout.

According to an aspect of an example embodiment, a method of manufacturing a mask may include receiving a first layout including patterns for manufacturing a semiconductor device, generating a second layout by performing an ML-based PPC method on the first layout, generating a third layout by performing an OPC on the second layout, transferring the third layout as mask tape-out (MTO) design data, preparing mask data based on the MTO design data, and exposing a substrate for the mask based on the mask data.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Figure 1:
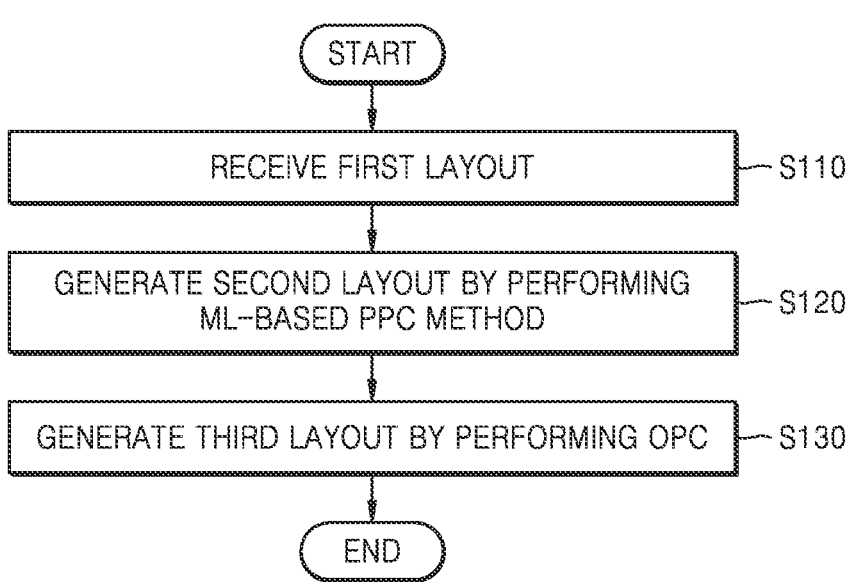
FIG. 1 is a flowchart illustrating a method of manufacturing a semiconductor device according to an example embodiment.

Hereinafter, embodiments of the disclosure will be described in detail with reference to the accompanying drawings. The same reference numerals are used for the same components in the drawings, and redundant descriptions thereof are omitted.

FIG. 1 is a flowchart illustrating a method of manufacturing a semiconductor device according to an example embodiment.

Referring to FIG. 1, in operation S110, a first layout including patterns for manufacturing the semiconductor device may be received. The first layout may be a layout of an after cleaning inspection (ACI). In other words, the first layout may be a target layout desired to be obtained in the ACI. The ACI may refer to an inspection after an etching process for substantially forming a pattern on a substrate.

The operation S110 of receiving the first layout may correspond to a process of connecting data of a measurement ACI to the first layout. For example, data of the measurement ACI may be converted into data such as a polygon, a coordinate, and a vertex of the first layout, and the sum of left/right or up/down bias for each edge and the size polygon (i.e. a retarget critical dimension (CD)) may be linked with the data of the instrumentation ACI.

Next, in operation S120, a second layout may be generated by performing a machine learning (ML)-based process proximity correction (PPC) method on the first layout. A PPC may be used as a method of predicting an ACI CD in an etching process after a photo process and correcting a layout. That is, the PPC may refer to a process of compensating for deformation of the shape of a semiconductor pattern due to the influence of characteristics of patterns and the influence of etching skew when etching is performed. For example, the PPC may refer to a process of previously compensating for deformation of a shape during etching by previously deforming a shape of a part expected to be deformed through etching with respect to a specific pattern and reflecting the deformation to a layout.

In the method of manufacturing the semiconductor device of the present embodiment, the PPC may proceed by performing ML-based inference on features of patterns of the first layout. The second layout generated through the ML-based PPC may be a layout of an after development inspection (ADI). In other words, the second layout may be a target layout of a photo-resist (PR) desired to be obtained in the ADI. The ADI may refer to an inspection after a photo process for substantially forming a PR pattern on a substrate, and the photo process may include an exposure process and a developing process. The ML-based PPC will be described in more detail below with reference to FIGS. 5 to 8C.

Subsequently, in operation S130, a third layout may be generated by performing an optical proximity correction (OPC) on the second layout. The third layout may be a target layout with respect to patterns on a mask.

In order to form a target pattern on a substrate such as a wafer patterns on a mask and a layout thereof need to be generated. That is, the target pattern on the substrate may be formed by transferring the pattern on the mask onto the wafer substrate through the exposure process. Due to the characteristic of the exposure process, the shape of the target pattern on the substrate and the pattern on the mask may be different from each other. In addition, since the pattern on the mask is reduced and projected and transferred onto the substrate, the pattern on the mask may have a larger size than that of the target pattern on the substrate.

On the other hand, as a pattern is miniaturized, an optical proximity effect (OPE) may occur due to the influence between neighboring patterns during the exposure process, and in order to overcome this, OPC may be performed to suppress the occurrence of the OPE by correcting the layout with respect to the pattern on the mask.

The OPC may be largely divided into two types: the first type includes rule-based OPC, and the second type includes simulation-based or model-based OPC. General OPC may include a method of adding sub-lithographic features called serifs on the corners of a pattern, and a method of adding sub-resolution assist features (SRAFs) such as scattering bars as well as deformation of the layout of the pattern.

Basic data may be prepared for the OPC. The basic data may include data of shapes of patterns of a sample, positions of the patterns, the type of measurement such as measurement of a space or line of the pattern, a basic measurement value, etc. In addition, the basic data may include information such as thickness, refractive index, and dielectric constant of the PR, and may include a source map with respect to the type of an illumination system. The basic data is not limited to the exemplified data described above.

After preparing the basic data, an optical OPC model may be generated. Generation of the optical OPC model may include optimization of a defocus stand (DS) position, a best focus (BF) position, etc., in the exposure process. In addition, the generation of the optical OPC model may include generation of an optical image in consideration of the diffraction phenomenon of light or the optical state of an exposure facility itself. The generation of the optical OPC model is not limited to the above. For example, the generation of the optical OPC model may include various contents related to optical phenomena in the exposure process.

After the optical OPC model is generated, an OPC model of the PR may be generated. Generation of the OPC model of the PR may include optimization of a threshold value of the PR. The threshold value of the PR may be a threshold value at which a chemical change occurs in the exposure process, and for example, the threshold value may be given as an intensity of exposure light. The generation of the OPC model of the PR may also include selecting an appropriate model form from several PR model forms.

The optical OPC model and the OPC model of the PR may be collectively referred to as the OPC model. After the OPC model is generated, a simulation using the OPC model may be performed to generate an OPC layout. The third layout may correspond to the OPC layout.

Thereafter, the ORC may be performed on the OPC layout to determine a final OPC layout. The ORC may include, for example, a root mean square (RMS) calculation with respect to a CD error, an edge placement error (EPE) calculation, a pinch error inspection, a bridge error inspection, etc. The items inspected in the ORC are not limited to the above items.

Subsequently, the final OPC layout may be transferred to a mask team as mask tape-out (MTO) design data to manufacture a mask, and a photo process, an etching process, etc., are performed using the mask to form a pattern on the wafer, and thus the semiconductor device may be manufactured. In the method of manufacturing the semiconductor device according to an embodiment, the semiconductor device may refer to the mask or a semiconductor device on a wafer manufactured using the mask. A mask manufacturing method will be described in more detail below with reference to FIG. 9.

The semiconductor device manufacturing method of the present embodiment may include the ML-based PPC method. In addition, the ML-based PPC method may include a process of generating an ACI target with a maximized process margin, and may generate a layout (e.g., a layout of an ADI using the generated ACI target). Accordingly, the semiconductor device manufacturing method of the present embodiment may generate the layout of the ADI with high consistency and maximized process margin through the ML-based PPC method. The process margin has the same concept as a process window (PW), and is hereinafter referred to as a process margin.

The semiconductor device manufacturing method of the present embodiment may perform the PPC method and the OPC to maximize the process margin in response to various conditions, such as for each area within a wafer and/or for each vertical height, rather than a single fixed condition, from the viewpoint of maximizing the process margin pursued by a semiconductor process. For example, as described below, an ACI CD may be different for each area within the wafer, and in the case of a high aspect ratio contact (HARC), the ACI CD may be different for each vertical height. The ML-based PPC method in the semiconductor device manufacturing method of the present embodiment may predict ACI CD data for each area of the wafer and/or for each vertical height, and generate the ACI target as far as possible from the upper limit or the lower limit allowed in the process, thereby maximizing the process margin.

Figure 2:
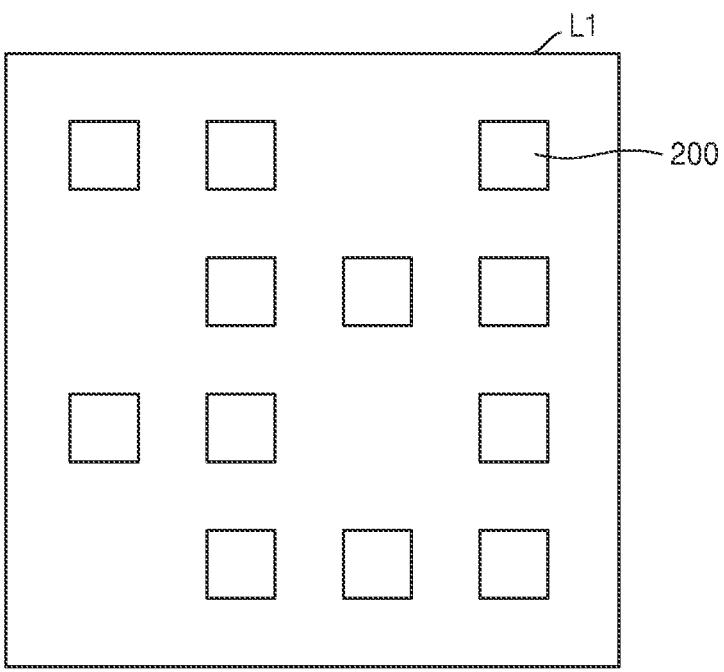
FIGS. 2, 3 and 4 are diagrams of layouts in respective operations of FIG. 1 according to an example embodiment.
Figure 3:
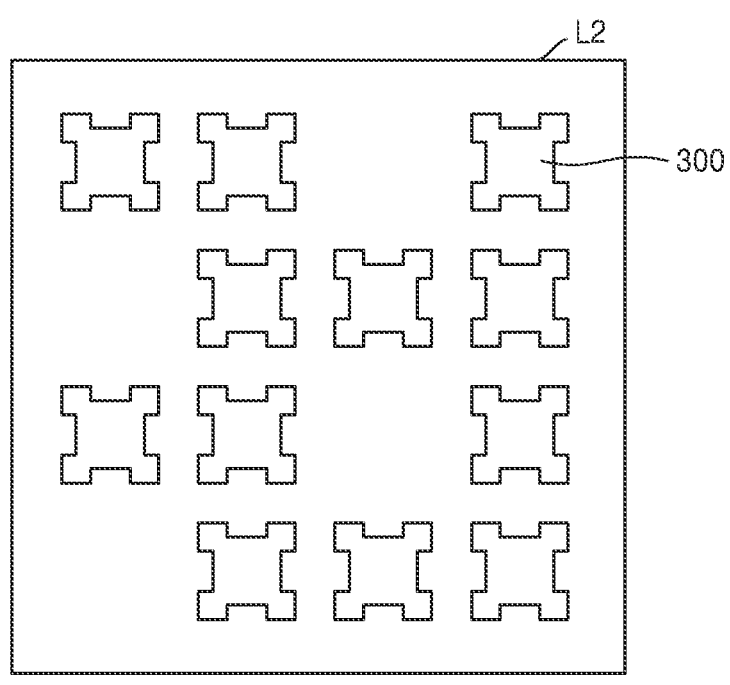
Figure 4:
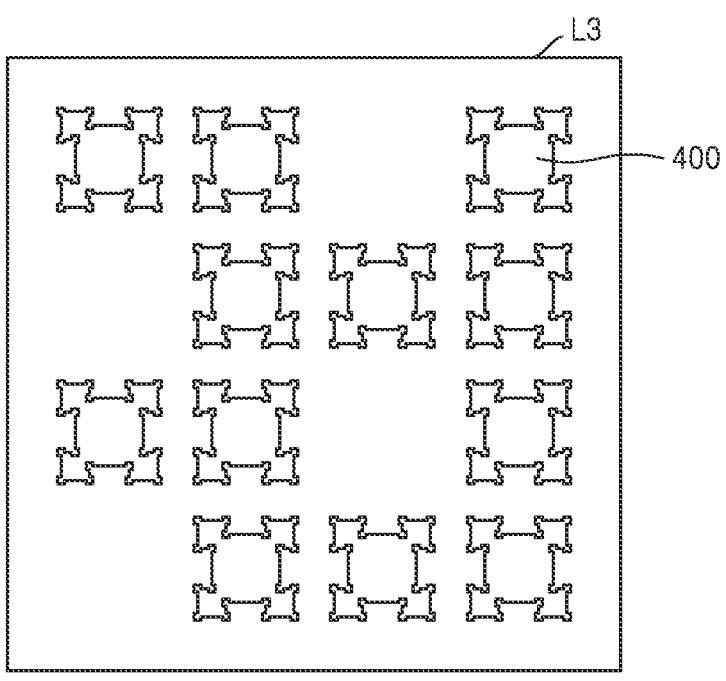

FIGS. 2, 3 and 4 are diagrams of layouts in respective operations of FIG. 1 according to an example embodiment. .FIG. 2 corresponds to a first layout L1, FIG. 3 corresponds to a second layout L2, and FIG. 4 corresponds to a third layout L3.

Referring to FIG. 2, the first layout L1 may include rectangular patterns, such as pattern 200. For example, the rectangular patterns may be patterns of vias. That is, the first layout L1 may be a layout for generating the vias. The first layout L1 may be a target layout intended to be obtained in an ACI. The patterns included in the first layout L1 are not limited to the vias. Also, shapes of the patterns of the vias are not limited to a quadrangle.

Referring to FIG. 3, patterns of the second layout L2, such as pattern 300, may have shapes modified from the patterns of the first layout L1 of FIG. 2. The second layout L2 may be a target layout intended to be obtained in the ADI. In FIG. 3, it is illustrated that all of the patterns are deformed to the same shape. However, this is merely an example for description, and, based on the positions of the patterns, the patterns may be transformed into different shapes.

Referring to FIG. 4, the patterns of the third layout L3, such as pattern 400, may have shapes modified from the patterns of the second layout L2 of FIG. 3. The third layout L3 may be a layout of a mask. That is, patterns of the third layout L3 may correspond to patterns to be formed on the mask. In FIG. 4, it is illustrated that all of the patterns are also deformed to the same shape. However, FIG. 4 is also merely an example for description, and, based on positions of the patterns, the patterns may be transformed into different shapes.

A process of generating the second layout L2 of FIG. 3 from the first layout L1 of FIG. 2 may correspond to a PPC. For example, the PPC may be a rule-based PPC. The rule-based PPC may be based on information about edges of patterns, such as widths and spaces of patterns. As another embodiment, the PPC may be a model-based. The model-based PPC may be performed using a pixel-basis image of a layout. The model-based PPC may process an image to predict a critical dimension (CD) and perform correction according to a prediction result.

The rule-based PPC may perform fewer operations than the model-based PPC. However, since the rule-based PPC uses less information than the model-based PPC, the accuracy of the rule-based PPC may be lower than that of the model-based PPC. Conversely, since the model-based PPC uses a larger amount of information for operations than the rule-based PPC, the accuracy of the model-based PPC may be higher than that of the rule-based PPC. However, a computational amount of the model-based PPC may be greater than that of the rule-based PPC.

In the method of manufacturing the semiconductor device according to an embodiment, the ML-based PPC may be performed by extracting features of the pattern of the first layout and performing an ML-based inference, and thus the PPC having improved accuracy and reduced amount of computation may be performed. In addition, the ML-based PPC may be performed in response to various conditions, such as for each area within a wafer and/or for each vertical height, rather than a single condition, and thus the process margin may be maximized.

Figure 5:
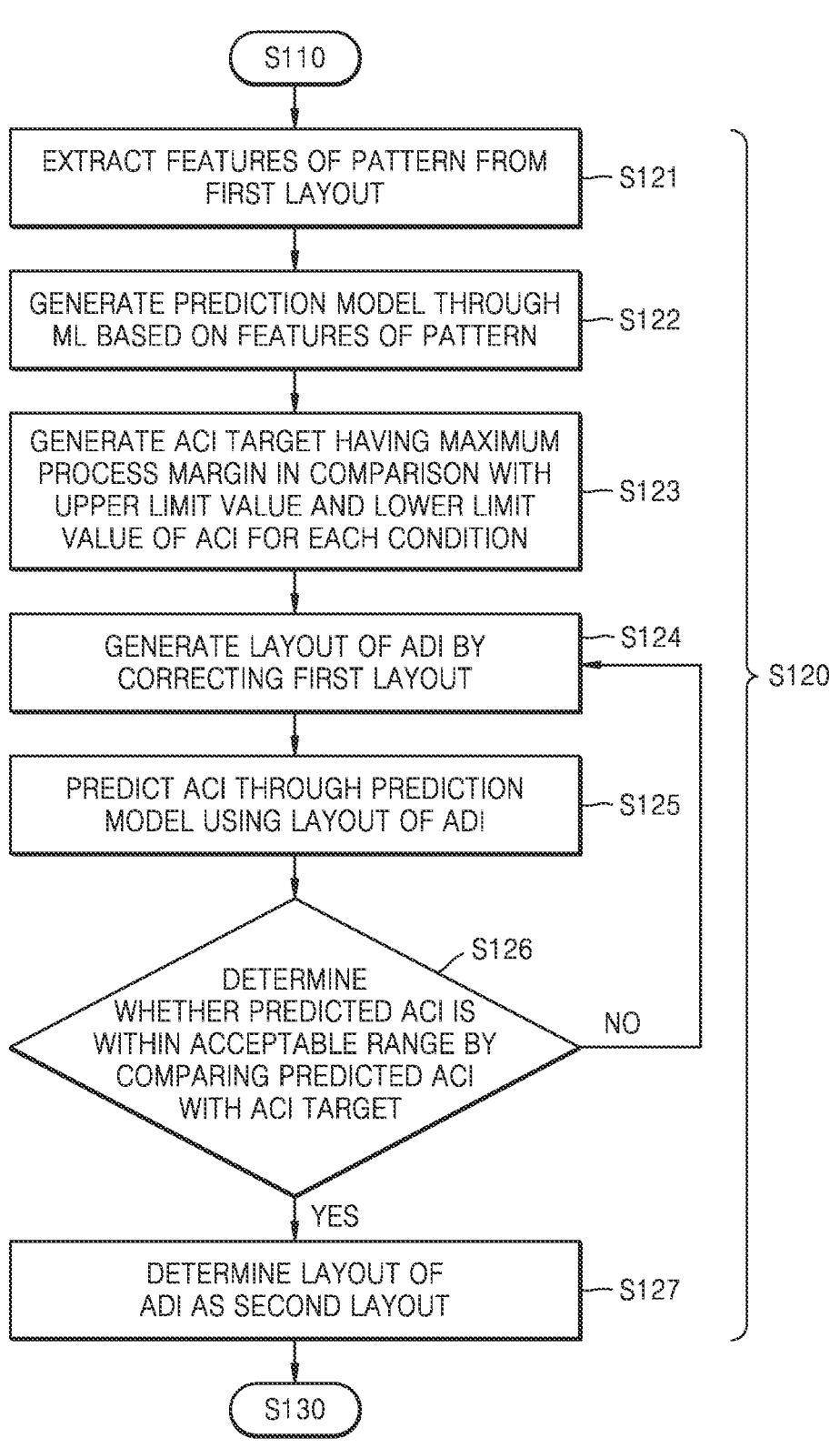
FIG. 5 is a flowchart illustrating an operation of generating a second layout of FIG. 1 according to an example embodiment.

FIG. 5 is a flowchart illustrating an operation (e.g., operation S120) of generating a second layout of FIG. 1 according to an example embodiment. The descriptions already given with reference to FIGS. 1 to 4 will be briefly provided or omitted.

Referring to FIG. 5, in the method of manufacturing the semiconductor device according to an embodiment, operation S120 of generating the second layout may include operations S121-S127. In operation S121, features of patterns may be extracted from a first layout. For example, one or more features may be extracted from each of the patterns in an image of the first layout. Also, the same type of features or different types of features may be extracted from each of the patterns. The features may include a characteristic of each of the patterns and an influence received in each of the patterns from adjacent patterns upon etching. The characteristic of each of the patterns may be, for example, the size and shape of each of the patterns.

Specifically, the features of the patterns may be reduced to several terms as follows. For example, the characteristic of each of the patterns may be extracted as numerical values such as tone, direction, length, density, sublayer, width and space of neighboring segments in the normal direction, information about next/previous segments, harmonics, etc.

Operation S121 of extracting the features of the patterns from the first layout may include tagging the features extracted from each of the patterns to each of the patterns. That is, an influence applied to each of the patterns during etching may be tagged and given to each of the patterns.

In operation S122, a prediction model may be generated through ML based on the features of the patterns. In this regard, for compensation, a size term of the first layout may be processed as a one-to-one function. In addition, in order to improve the performance of the prediction model, for example, linear regression, which is a one-to-one function and strong to extrapolation, may be used, and an advanced ML having strong interpolation performance such as random forest may be used. Accordingly, the correction convergence and the performance of the prediction model may be complemented with each other.

The amount of information included in the features may be greater than the amount of information used in the rule-based PPC. Thus, ML-based inference with respect to the features, i.e., a feature-based PPC, may be more accurate than the rule-based PPC. However, the amount of information included in the features may be less than the amount of information used in the model-based PPC. Since the amount of information is reduced, the amount of computation of the feature-basis PPC may be less than that of the model-based PPC. In addition, since information close to noise is removed and information directly affecting each of the patterns is reflected to the inference during etching, the feature-basis PPC may be more accurate than the model-based PPC.

The prediction model may include a prediction model for each condition. The condition may be, for example, an area within a wafer where a pattern is located, or, when the pattern is a HARC, a vertical height of the pattern.

After the prediction model is generated, in operation S123, an ACI target having the maximum process margin may be generated by comparing the upper limit value and the lower limit value of the ACI for each condition. As mentioned above, the condition may include the area within the wafer where the pattern is located, or, when the pattern is the HARC, the vertical height of the pattern. In addition, the condition may also include the area within the wafer where the pattern is located, and the vertical height of the pattern. A process of generating the ACI target will be described in more detail with specific examples with reference to FIGS. 6A to 8B.

After generating the ACI target, in operation S124, the first layout corresponding to the ACI target may be corrected, and a layout of the ADI may be generated based on the corrected first layout. For example, the layout of the ADI may be generated by adjusting own parts of the patterns, such as sizes, shapes, etc., of the patterns, based on the ACI target and the first layout corresponding thereto. A process of generating the layout of the ACI may correspond to a retarget process, and, as described above with reference to FIG. 1, may be used as an input of an OPC later. Thereafter, using the layout of the ADI, in operation S125, the ACI may be predicted through the prediction model. In other words, the layout of the ACI may be output by inputting the layout of the ADI into the prediction model.

Subsequently, in operation S126, it may be determined whether the predicted ACI is within an acceptable range by comparing the predicted ACI with the ACI target. For example, when a difference between the predicted ACI and the ACI target is less than a preset threshold value, the predicted ACI may be considered to be within the allowable range, and when the difference is greater than the threshold value, the predicted ACI may be considered to be beyond the allowable range.

When the predicted ACI is within the allowable range (Yes in operation S126), in operation S127, the layout of the ADI may be determined as the second layout, and the process proceeds to operation S130 of generating a third layout. When the predicted ACI is beyond the allowable range (No in operation S126), the process proceeds to operation S124 of generating the layout of the ADI. Before proceeding to the operation S124 of generating the ADI layout, the first layout may be corrected by adjusting the features. For example, the own features of the patterns, such as sizes, shapes, etc. of the patterns may be adjusted. As the own features of the patterns are adjusted, features of the influence of the patterns on neighboring patterns may also be updated.

Operation S124 of generating the layout of the ADI, operation S125 of predicting the ACI through the prediction model, and operation S126 of determining whether the predicted ACI is within the acceptable range may be repeated until the predicted ACI is within the acceptable range, that is, until the predicted ACI approaches the ACI target. When the predicted ACI is within the allowable range, a final layout of the ADI, (e.g., the second layout) may be determined. Thereafter, the process proceeds to operation S130 of generating the third layout, and the OPC may be performed using the second layout.

Figure 6A:
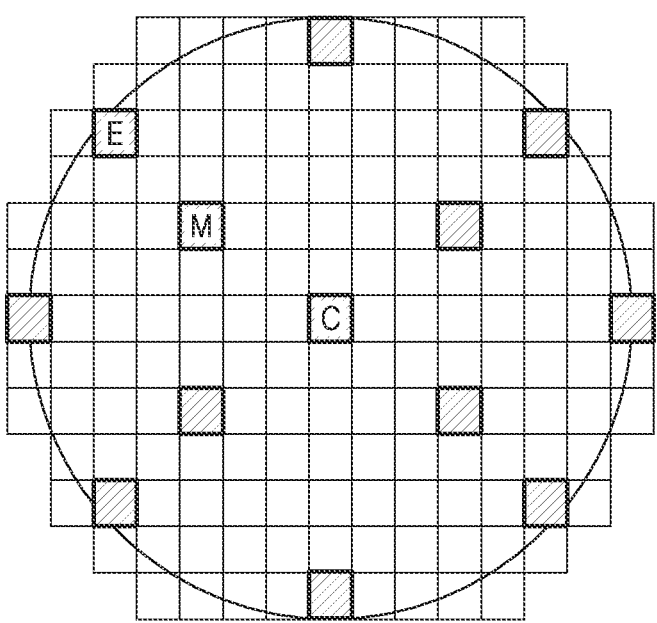
FIGS. 6A and 6B are diagrams illustrating generation of an after cleaning inspection (ACI) target of FIG. 5 according to an example embodiment.
Figure 6B:
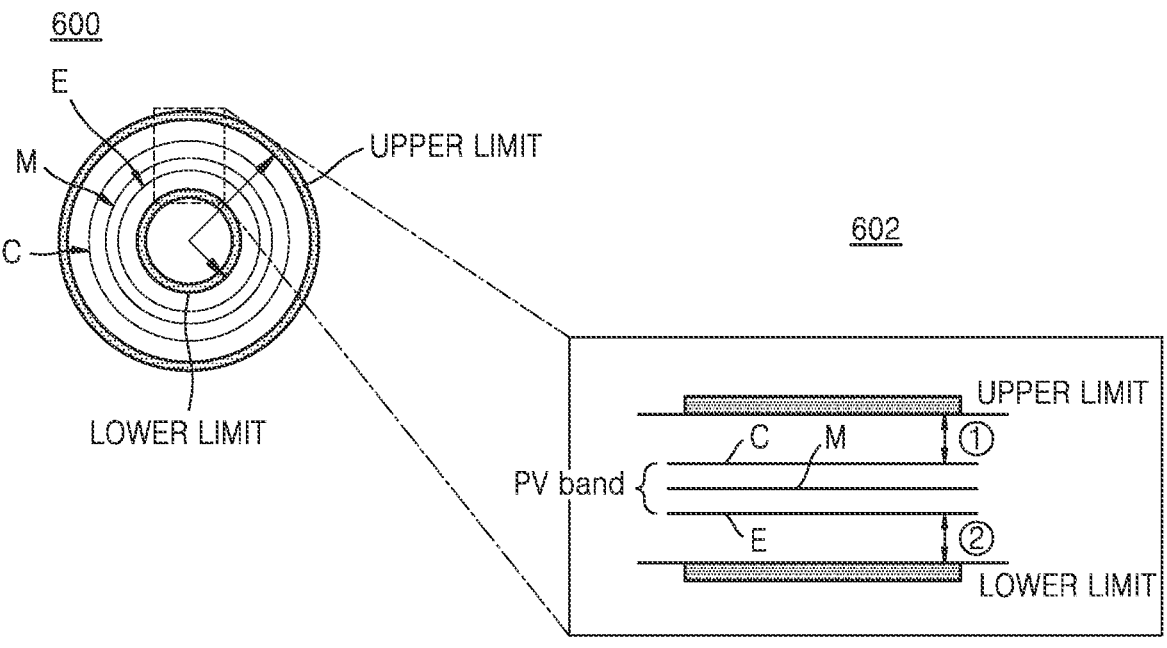

FIGS. 6A and 6B are diagrams illustrating generation of an after cleaning inspection (ACI) target of FIG. 5 according to an example embodiment. The descriptions already given with reference to FIGS. 1 to 5 will be briefly provided or omitted.

Referring to FIG. 6A, in an operation of generating the ACI target of FIG. 5, a condition may include, for example, an area within a wafer where a pattern is located. In other words, an ACI CD of the pattern may appear differently depending on which area in the wafer the pattern is located. Accordingly, it may be necessary to consider a process margin for each area within the wafer.

More specifically, as shown in FIG. 6A, ACI CDs of the patterns located in a center area C, a middle area M, and an edge area E of the wafer may be different from each other. Accordingly, when a PPC is performed using a preset ACI CD or an ACI CD in any one area, a problem in which a process margin is not sufficient may occur. As a result, errors such as bridging, pinching, and not-opening may occur in a semiconductor device due to an insufficient process margin. Accordingly, in a method of manufacturing the semiconductor device of the present embodiment, the ACI target maximizing the process margin is generated through CD prediction for each area in the wafer, as will be described below.

Referring to FIG. 6B, the diagram 600 shows an ACI CD predicted in the corresponding areas, the upper limit value of the ACI CD allowed in a process (hereinafter referred to as the 'process upper limit value'), and the lower limit value of the ACI CD allowed in the process (hereinafter referred to as the 'process lower limit value'). In addition, the diagram 602 shows the predicted ACI CD of the corresponding areas, with straight lines and heights, and the process upper and lower process limit values. A range of the predicted ACI CD of the corresponding areas may correspond to a process variation (PV) band, and by setting an optimal ACI target, a marge of the PV may be maximized.

The optimal ACI target may be generated as follows. For example, when the predicted ACI of the center area C is the largest, a difference ① between the process upper limit value and the predicted ACI CD of the center area C is calculated. Also, when the predicted ACI of the edge area E is the smallest, a difference ② between the process lower limit value and the predicted ACI CD of the edge area E is calculated. Thereafter, the ACI target is generated so that the smaller vale of ① and ② is maximized. A more detailed process of generating the ACI target will be described with reference to FIGS. 8A to 8C.

In the method of manufacturing the semiconductor device according to an embodiment, in order to solve the problem of the insufficient process margin, a CD or an EPE is predicted for each area in the wafer, the difference between the upper limit value and the lower limit value allowed in the process is calculated, and the ACI target maximizing the process marge is generated. Thereafter, the ACI is predicted through an ML-based PPC using the generated ACI target, and a layout of the ADI (e.g., a second layout) is corrected through a retarget process using the ACI target, thereby securing the consistency of correction of the layout and performing the ML-based PPC that maximizes the process margin.

FIGS. 7A, 7B, 7C and 7D are diagrams illustrating generation of the ACI target of FIG. 5 according to an example embodiment. The descriptions already given with reference to FIGS. 1 to 5 will be briefly provided or omitted.

Figure 7A:
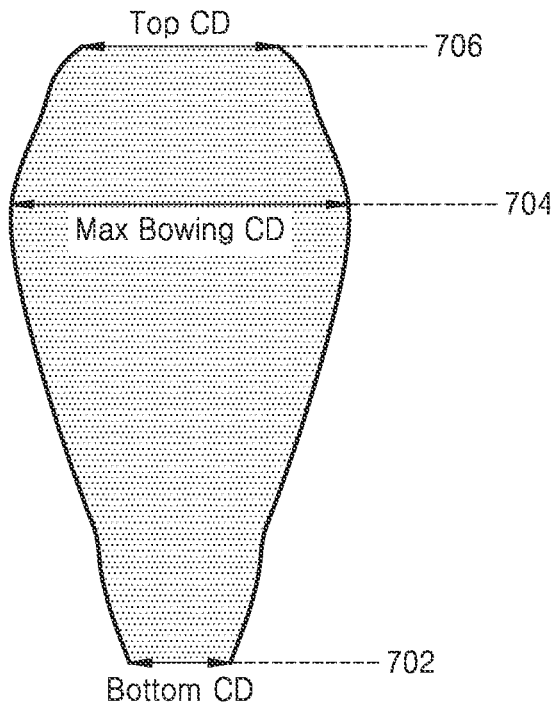
FIGS. 7A, 7B, 7C and 7D are diagrams illustrating generation of the ACI target of FIG. 5 according to an example embodiment.

Referring to FIG. 7A, in an operation of generating the ACI target of FIG. 5, a condition may include, for example, a vertical height of a pattern. In other words, when the pattern is a HARC, an ACI CD at the corresponding height may appear different depending on the vertical height of the pattern. Accordingly, it may be necessary to consider a process margin for each vertical height of the pattern.

More specifically, as shown in FIG. 7A, the pattern corresponding to HARC is divided into a bottom height 702, a middle height 704, and a top height 706, and ACI CDs at respective heights may be different from each other. The pattern may have a maximum bowing width at the middle height 704. Accordingly, when a PPC is performed using a preset ACI CD or an ACI CD at any one position such as the height 706 of a top surface, a problem in which the process margin is not sufficient may occur. Accordingly, in a method of manufacturing a semiconductor device according to an embodiment, the ACI target maximizing the process margin is generated through a CD prediction for each vertical height of the pattern, as will be described below.

Figure 7B:
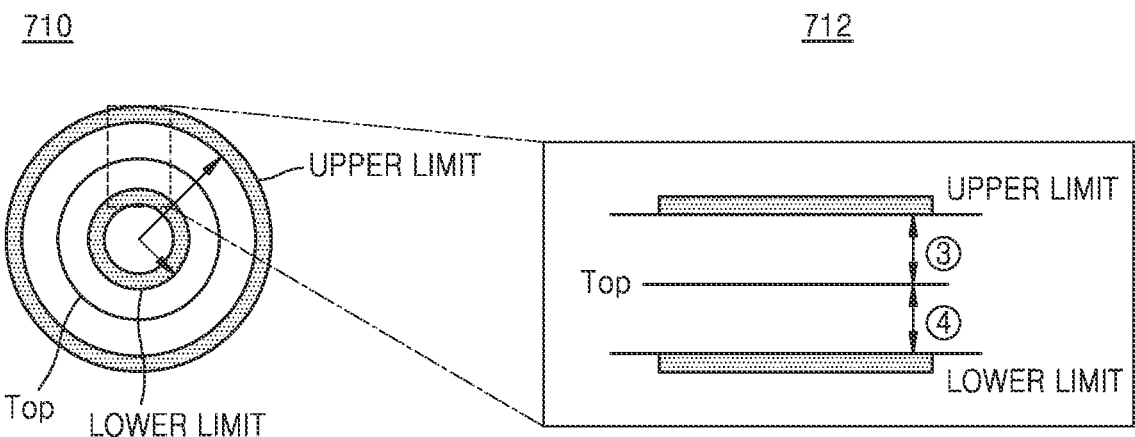
Figure 7C:
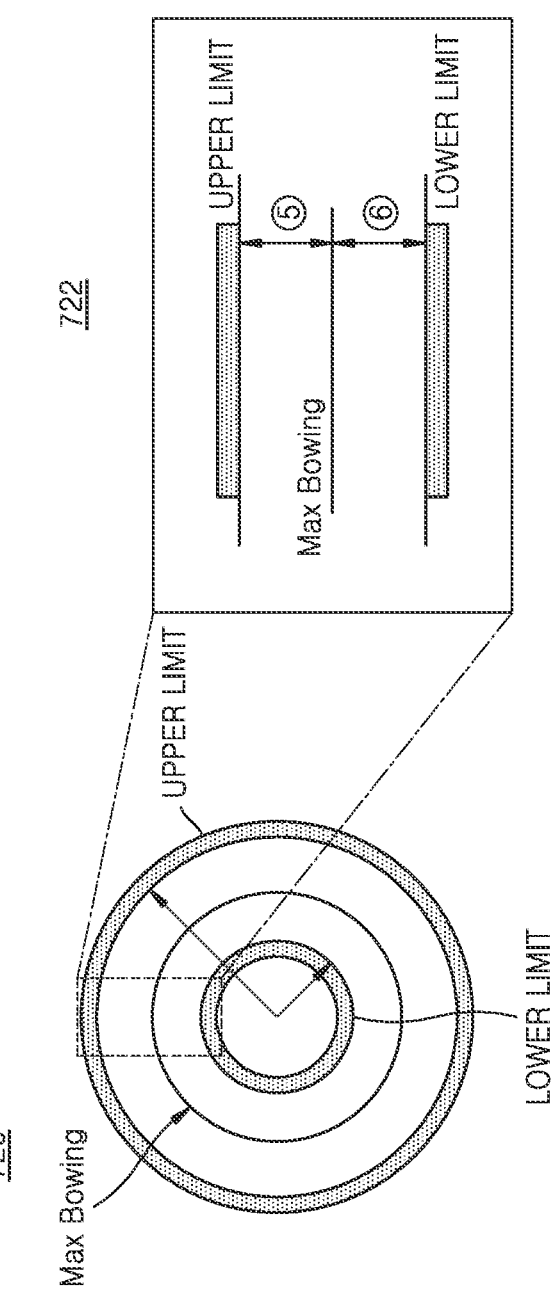
Figure 7D:
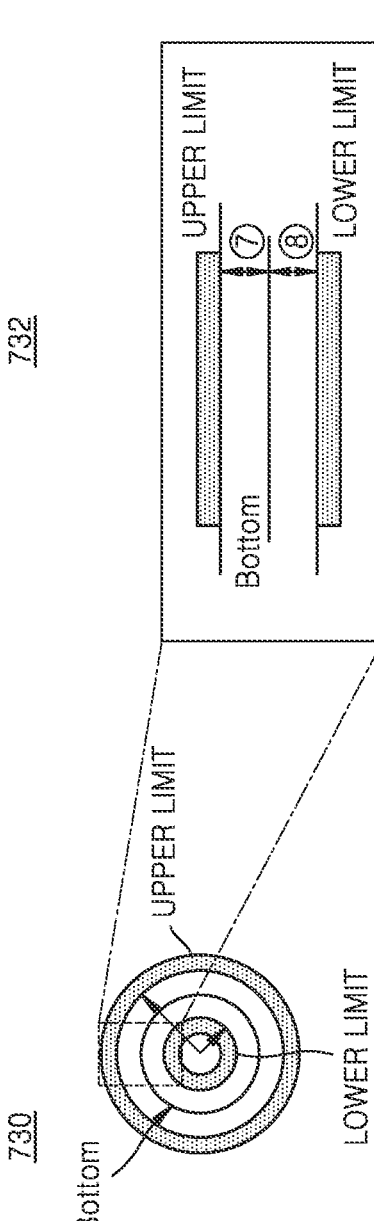

Referring to FIGS. 7B to 7D, in FIG. 7B, diagram 710 shows an ACI CD predicted from the top height (e.g., height 706) of the pattern, and the process upper and lower limit values. In addition, diagram 712 shows the predicted ACI CD of the top height of the pattern with straight lines and height, and the process upper and lower limit values.

In FIG. 7C, diagram 720 shows a predicted ACI CD at the middle height (e.g., middle height 704) of the pattern, and the process upper and lower limit values. In addition, diagram 722 shows the predicted ACI CD of the middle height of the pattern with straight lines and height, and the process upper and lower limit values.

In FIG. 7D, diagram 730 shows an ACI CD predicted from the bottom height of the pattern (e.g., height 702), and the process upper and lower limit values. In addition, diagram 732 shows the predicted ACI CD of the bottom height of the pattern with straight lines and height, and the process upper and lower limit values.

For reference, in the case of a HARC pattern, the process upper and lower limit values may be set differently depending on the vertical height. For example, at the middle height having the maximum bowing width, the process upper and lower limit values are the largest, and a space therebetween may also be the largest. However, according to an embodiment, the process upper and lower limit values may be set differently from the previous ones depending on the vertical height. For example, the process upper and lower limit values may be set to be the same regardless of the vertical height.

An optimal ACI target may be created as follows. For example, at the top height of the pattern (e.g., height 706), a difference ③ between the process upper limit value and the predicted ACI CD is obtained, and a difference 4 between the process lower limit value and the predicted ACI CD is calculated. Also, at the middle height of the pattern (e.g., height 704), a difference ⑤ between the process upper limit value and the predicted ACI CD is obtained, and a difference ⑥ between the process lower limit value and the predicted ACI CD is obtained. Then, at the bottom height of the pattern (e.g., height 702), a difference ⑦ between the process upper limit value and the predicted ACI CD is obtained, and a difference ⑧ between the process lower limit value and the predicted ACI CD is calculated. Thereafter, the ACI target is generated such that the minimum value among the differences ③, ④, ⑤, ⑥, ⑦, and ⑧ is maximized. For example, when the difference ⑦ is the smallest value, the ACI target may be generated such that the difference ⑦ is maximized.

Although the CD is described with reference to FIGS. 6A to 7D, the EPE may be used instead of the CD. Also, the disclosure is not limited thereto, and the ACI target may be generated by using the CD and the EPE together.

Figure 8A:
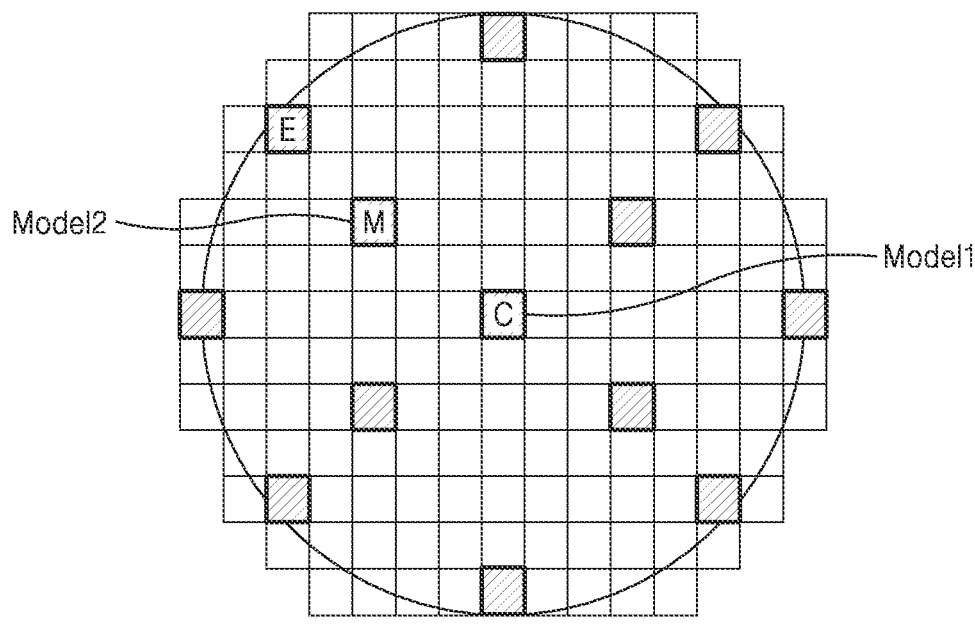
FIG. 8A is a diagram illustrating generation of the ACI target of FIG. 5, according to an example embodiment.
Figure 8B:
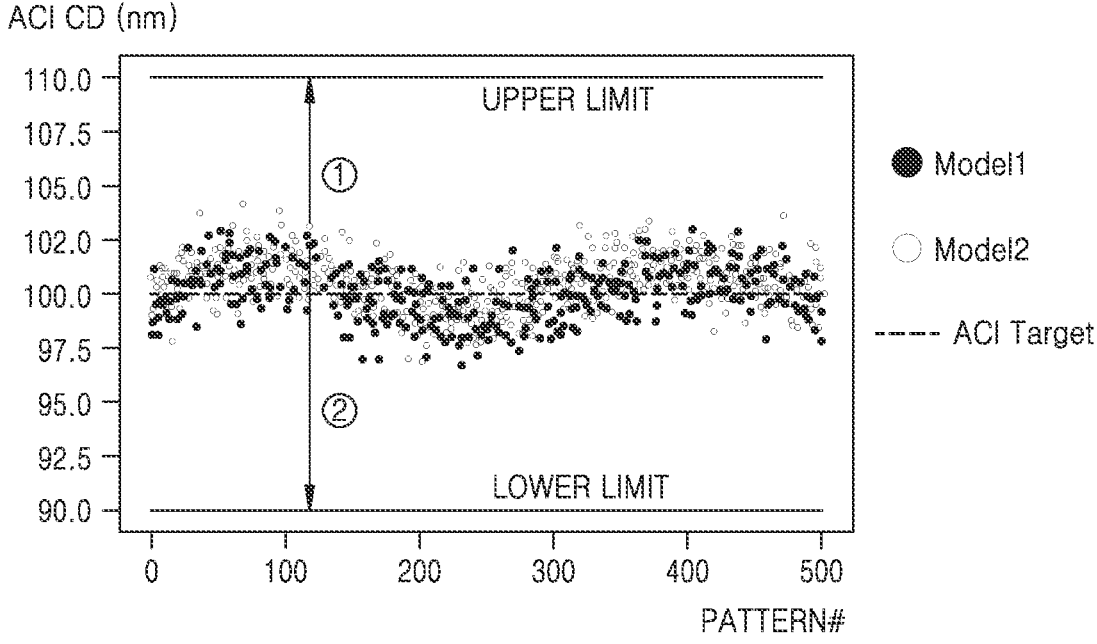
FIGS. 8B and 8C are graphs illustrating generation of the ACI target of FIG. 5 according to an example embodiment.
Figure 8C:
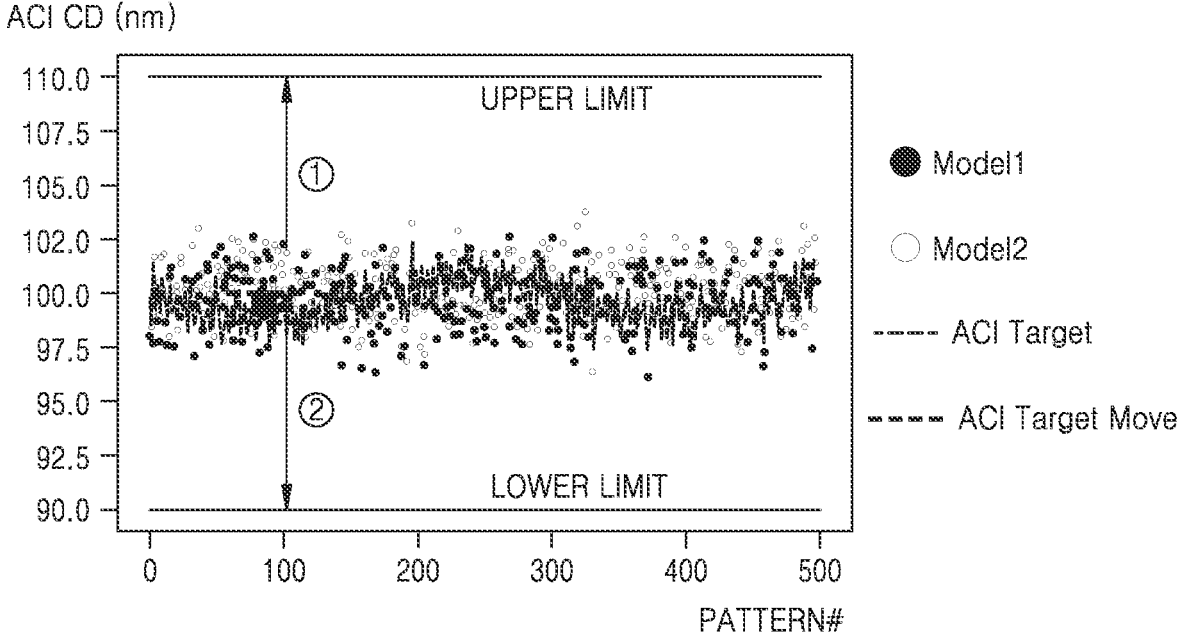

FIG. 8A is a diagram illustrating generation of the ACI target of FIG. 5, according to an example embodiment. FIGS. 8B and 8C are graphs illustrating generation of the ACI target of FIG. 5 according to an example embodiment. In FIGS. 8B and 8C, an x-axis may refer to the number of patterns, a y-axis may refer to an ACI CD, and a unit may be in nm.

Referring to FIGS. 8A to 8C, first, ACI CDs of individual patterns of the center area C and the middle area M of FIG. 8A are predicted. For example, ACI CDs of 500 individual patterns in the center area C and the middle area M are predicted.

As shown in the graph of FIG. 8B, the predicted ACI CDs and the process upper and lower limit values may be displayed with respect to the patterns for each area. In FIG. 8B, the patterns in the center area C correspond to Model1 and are indicated as black dots, and the patterns in the middle area M correspond to Model2 and are indicated as white dots. Also, in FIG. 8B, an upper solid line may indicate the process upper limit value, a lower solid line may indicate the process low limit value, and a central dotted line may indicate an initial ACI target. The initial ACI target may be set to an intermediate position between the process upper and lower limit values. However, the setting of the initial ACI target is not limited thereto.

Thereafter, a difference between the predicted ACI CD and the process upper limit value or the process lower limit value may be calculated by comparing the predicted ACI CD and the process upper limit value or the process lower limit value for each pattern. For example, with respect to any one pattern, when the ACI CD of Model2 is greater than the ACI CD of Model1, the difference ① is obtained by subtracting the ACI CD of Model2 from the process upper limit value, and the difference ② is obtained by subtracting the process lower limit value from the ACI CD of Model1.

Subsequently, the initial ACI target may be moved such that a process margin is maximized. For example, with respect to the pattern, the initial ACI target is moved by $(①-②) \times 0.5$. When the initial ACI target is moved by $(①-②) \times 0.5$, the differences ① and ② are the same, and the process margin may be maximized. As described above, by comparing the predicted ACI CD of the corresponding pattern with the process upper limit value and the process lower limit value and appropriately moving the initial ACI target, a new ACI target with the maximized process margin may be generated.

In FIG. 8C, black dotted lines indicate the new ACI target generated by moving the initial ACI target through the above-described method. Also, thick dotted lines and arrows are shown, which actually shows a process of moving the initial ACI target with respect to specific patterns. In addition, when there are two or more models, as in a PV band of FIG. 6B, by calculating the minimum/maximum in comparison with the upper limit value and the lower limit value, and appropriately moving the initial ACI target based on the minimum/maximum to generate the ACI target, the process margin may be maximized.

Figure 9:
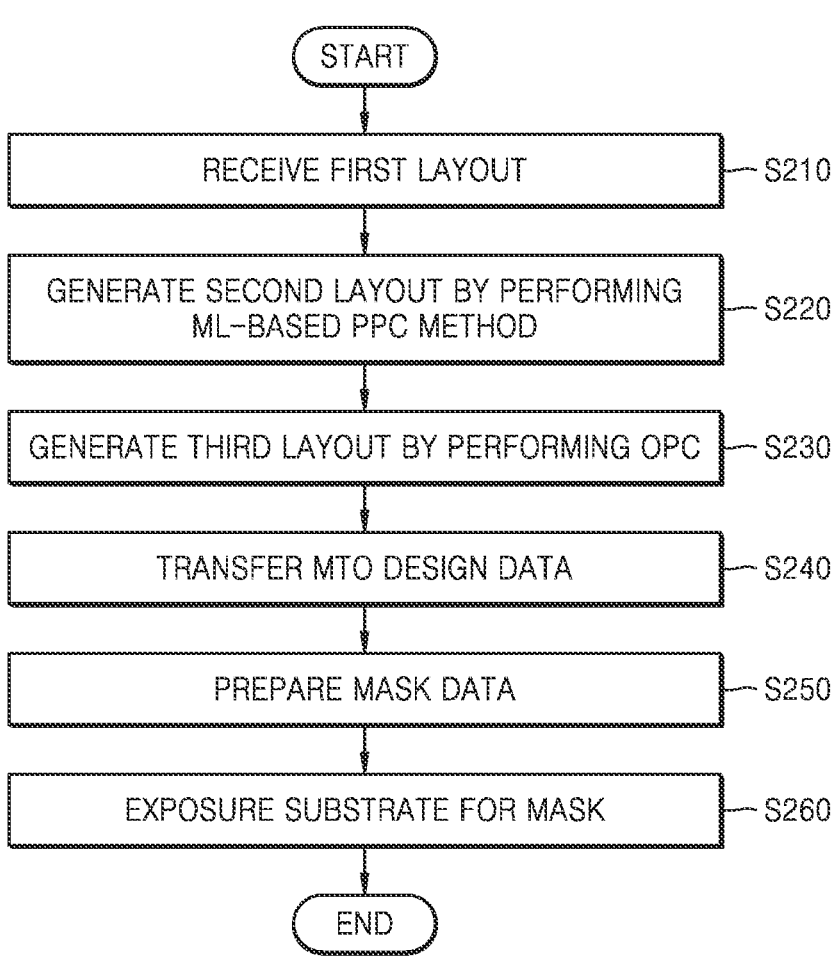
FIG. 9 is a flowchart illustrating a method of manufacturing a mask according to an example embodiment.

FIG. 9 is a flowchart illustrating a method of manufacturing a mask according to an example embodiment. The descriptions already given with reference to FIGS. 1 to 8C will be briefly provided or omitted.

Referring to FIG. 9, operation S210 of receiving a first layout, operation S220 of generating a second layout, and operation S230 of generating a third layout May be sequentially performed. Operations S210-S230 may be substantially the same as operations S110-S130 of FIG. 1, respectively. Accordingly, detailed descriptions thereof will be omitted. The third layout may correspond to an OPC layout, and may also correspond to a final OPC layout that has passed an ORC.

Subsequently, in operation S240, a final OPC layout image may be transferred to a mask manufacture team as mask tape-out (MTO) design data. In general, an MTO may refer to transferring final mask data obtained through the OPC to the mask manufacture team and requesting the mask manufacture team to manufacture a mask. Accordingly, the MTO design data may eventually be substantially the same as data of the final OPC layout image obtained through the OPC. The MTO design data may have a graphic data format used in electronic design automation (EDA) software, etc. For example, the MTO design data may have a data format such as Graphic Data System II (GDS2), Open Artwork System Interchange Standard (OASIS), etc.

Thereafter, in operation S250, a mask data preparation (MDP) may be performed. The MDP may include, for example, i) format conversion, referred to as fracturing, ii) augmentation, such as barcodes for mechanical reading, standard mask patterns for inspection, job deck, etc., and iii) verification of automatic and manual methods. The job deck may refer to generating a text file related to a series of instructions, such as arrangement information of multiple mask files, a reference dose, an exposure speed or method, etc.

On the other hand, the format conversion, that is, fracturing, may refer to a process of fracturing the MTO design data for each area and changing the MTO design data to a format for electron beam exposure machine. Fracturing may include data manipulation such as scaling, sizing data, rotation of data, reflection of pattern, inversion of color, etc. In a conversion process through fracturing, data of numerous systematic errors that may occur anywhere during a transfer process from design data to an image on the wafer may be corrected. A data correction process on the systematic errors is called a mask process correction (MPC), and may include, for example, jobs of adjusting a line width called a CD adjustment and increasing a pattern arrangement precision. Therefore, fracturing may contribute to improving the quality of a final mask and may also be a process performed prior to the MPC. The systematic errors may be caused by distortions occurring in an exposure process, a mask development and etching process, a wafer imaging process, etc.

The MDP may include the MPC. As described above, the MPC may refer to a process of correcting an error occurring during an exposure process, that is, a systematic error. The exposure process may generally include electron beam writing, developing, etching, baking, etc. In addition, data processing may be performed prior to the exposure process. Data processing is a kind of preprocessing process on the mask data, and may include grammar check of the mask data, prediction of exposure time, etc.

After the MDP, in operation S260, a mask substrate may be exposed based on the mask data. The exposure may refer to, for example, electron beam writing. The electron beam writing may be performed in, for example, gray writing using a multi-beam mask writer (MBMW). In addition, the electron beam writing may be performed using variable shape beam (VSB) exposure machine.

After an operation of the MDP, a process of converting the mask data into pixel data before the exposure process may be performed. The pixel data is data directly used for actual exposure, and may include data about a shape that is an exposure object and data about a dose assigned thereto. The data about the shape may be bit-map data in which shape data, which is vector data, is converted through rasterization, etc.

After the exposure process, a series of processes are performed to complete the mask. The series of processes may include processes, for example, development, etching, cleaning, etc. In addition, the series of processes for manufacturing the mask may include a measurement process, a defect inspection process, or a defect repair process. In addition, a pellicle application process may be included. The pellicle application process may refer to a process of attaching a pellicle to a mask surface to protect the mask from subsequent contamination during a delivery of the mask and a useful life of the mask when it is confirmed that there are no contaminant particles or chemical stains through final cleaning and inspection.

The method of manufacturing the mask according to an embodiment may employ an ML-based PPC method, and the ML-based PPC method may be performed using an ACI target after generating the ACI target with a maximized process margin. Accordingly, in the mask manufacturing method according to an embodiment, a mask layout with high consistency and maximized process margin may be generated through the PPC method and the OPC method. As a result, the method of manufacturing the mask according to an embodiment may make it possible to manufacture a reliable mask based on a mask layout with a maximized process margin, and also to manufacture a reliable semiconductor device using the mask.

While the disclosure has been particularly shown and described with reference to embodiments thereof, it will be understood that various changes in form and details may be made therein without departing from the spirit and scope of the following claims.

What is claimed is:

1. A machine learning (ML)-based process proximity correction (PPC) method, comprising:
   receiving a first layout of an after clean inspection (ACI) comprising patterns for manufacturing a semiconductor device;
   extracting features of a first pattern from the first layout;
   generating a prediction model through ML based on the features of the first pattern;
   generating an ACI target having a maximum process margin by comparing an upper limit value and a lower limit value of the ACI for at least one condition;
   generating a second layout of an after development inspection (ADI) by correcting the first layout to correspond to the ACI target;
   predicting the ACI through the prediction model, based on the second layout of the ADI,
   based on the predicted ACI being within a predefined range, generate a third layout by performing an optical proximity correction (OPC) on the second layout, and
   exposing a substrate for a mask based on the generated third layout.

2. The ML-based PPC method of claim 1, wherein the at least one condition comprises an area within a wafer where the first pattern is located.

3. The ML-based PPC method of claim 2, wherein the area within the wafer is divided into a center area, a middle area, and an edge area,
   wherein the method further comprises determining differences between a predicted ACI value of the first pattern according to the center area, the middle area, and the edge area within the wafer and the upper limit value or the lower limit value, and
   wherein the ACI target is generated such that a minimum value among the determined differences is maximized.

4. The ML-based PPC method of claim 1, wherein the first pattern comprises a high aspect ratio contact (HARC), and
   wherein the at least one condition comprises a vertical height of the first pattern.

5. The ML-based PPC method of claim 4, wherein the first pattern is divided into a bottom height, a middle height, and a top height, and comprises a maximum bowing width at the middle height,
   wherein the method further comprises determining differences between a predicted ACI value of the bottom height, the middle height, and the top height of the first pattern and the upper limit value or the lower limit value, and
   wherein the ACI target is generated such that a minimum value among the differences is maximized.

6. The ML-based PPC method of claim 1, wherein the first pattern comprises a high aspect ratio contact (HARC), and the at least one condition comprises an area within a wafer where the first pattern is located, and a vertical height of the first pattern.

7. The ML-based PPC method of claim 6, wherein an ACI is further predicted based on a critical dimension (CD) or an edge placement error (EPE).

8. The ML-based PPC method of claim 6, wherein an initial ACIis set at an intermediate position between the upper limit value and the lower limit value, wherein a first difference value comprises a value between the upper limit value and a maximum predicted ACI, and a second difference value comprises a value between the lower limit value and a minimum predicted ACI, and wherein the ACI target is generated by moving the initial ACI by a movement value determined as 0.5 multiplied by a difference between the first difference value and the second difference value.

9. The ML-based PPC method of claim 1, further comprising:

comparing the predicted ACI with the ACI target; and determining whether the predicted ACI is within a predefined range, wherein the second layout of the ADI is generated in response to the predicted ACI being outside of the predefined range.

10. A method of manufacturing a semiconductor device, the method comprising:

receiving a first layout of an after clean inspection (ACI) comprising patterns for manufacturing the semiconductor device;

generating a second layout of an after development inspection (ADI) by performing a machine learning (ML)-based process proximity correction (PPC) method on the first layout;

generating a third layout by performing an optical proximity correction (OPC) on the second layout, and exposing a substrate for a mask based on the generated third layout.

11. The method of claim 10, wherein the generating of the second layout comprises:

extracting features of a first pattern from the first layout;

generating a prediction model through ML based on the features of the first pattern;

generating an ACI target having a maximum process margin by comparing an upper limit value and a lower limit value of the ACI for at least one condition; and predicting the ACI through the prediction model, based on the second layout of the ADI, wherein the second layout of the ADI is further generated by correcting the first layout.

12. The method of claim 11, wherein the at least one condition comprises at least one of an area within a wafer where the first pattern is located and a vertical height of the first pattern.

13. The method of claim 12, further comprising determining differences between a predicted ACI value of the first pattern for each area within the wafer or for each vertical height and the upper limit value or the lower limit value, wherein the ACI target is generated such that a minimum value among the determined differences is maximized.

14. The method of claim 12, wherein an initial ACI is set at an intermediate position between the upper limit value and the lower limit value, wherein a first difference value comprises a value between the upper limit value and a maximum predicted ACI, and a second difference value comprises a value between the lower limit value and a minimum predicted ACI; and wherein the ACI target is generated by moving the initial ACI by a movement value determined as 0.5 multiplied by a difference between the first difference value and the second difference value.

15. The method of claim 11, further comprising:

comparing the predicted ACI with the ACI target; and determining whether the predicted ACI is within a predefined range, wherein the second layout of the ADI is generated in response to the predicted ACI being outside the predefined range.

16. A method of manufacturing a mask, the method comprising:

receiving a first layout comprising patterns for manufacturing a semiconductor device;

generating a second layout by performing a machine learning (ML)-based process proximity correction (PPC) method on the first layout;

generating a third layout by performing an optical proximity correction (OPC) on the second layout;

transferring the third layout as mask tape-out (MTO) design data;

preparing mask data based on the MTO design data; and exposing a substrate for the mask based on the mask data.

17. The method of claim 16, wherein the generating of the second layout comprises:

extracting features of a first pattern from the first layout;

generating a prediction model through ML based on the features of the first pattern;

generating an after clean inspection (ACI) target having a maximum process margin by comparing an upper limit value and a lower limit value of the ACI for at least one condition;

generating the second layout by correcting the first layout, wherein the second layout is of an after development inspection (ADI); and predicting the ACI through the prediction model, based on the second layout of the ADI.

18. The method of claim 17, wherein the at least one condition comprises at least one of an area within a wafer where the first pattern is located and a vertical height of the first pattern, wherein the method further comprises determining differences between a predicted ACI value of the first pattern for each area within the wafer or for each vertical height and the upper limit value or the lower limit value, and wherein the ACI target is generated such that a minimum value among the determined differences is maximized.

19. The method of claim 17, wherein an initial ACI is set at an intermediate position between the upper limit value and the lower limit value, wherein a first difference value comprises a value between the upper limit value and a maximum predicted ACI, and a second difference value comprises a value between the lower limit value and a minimum predicted ACI, and wherein the ACI target is generated by moving the initial ACI by a movement value determined as 0.5 multiplied by a difference between the first difference value and the second difference value.

20. The method of claim 17, further comprising comparing the predicted ACI with the ACI target and determining whether the predicted ACI is within a predefined range, wherein the second layout of the ADI is generated in response to the predicted ACI being outside the predefined range.

* * * * *